Nov. 8, 1949    G. F. JENKINS    2,487,556
CONTROL APPARATUS
Filed Oct. 8, 1945
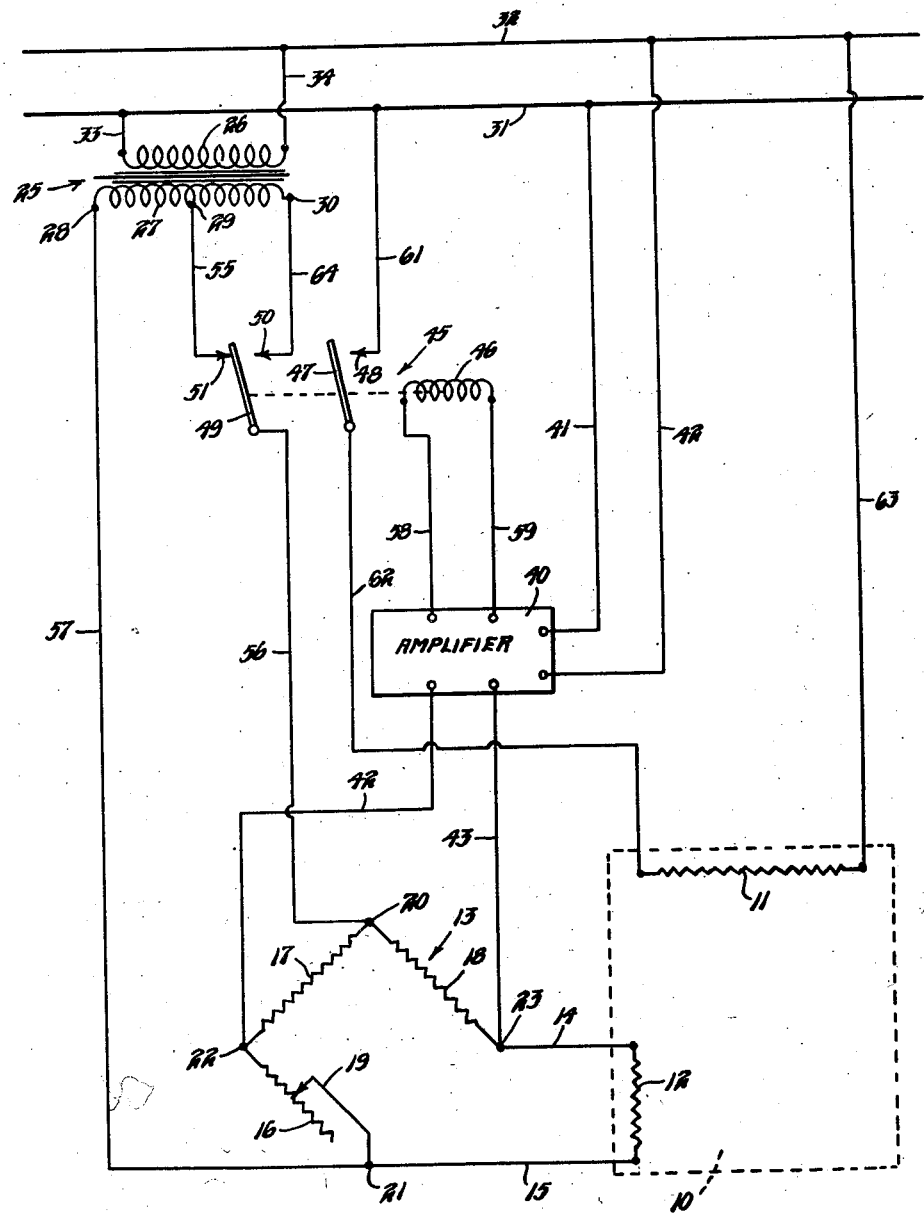
INVENTOR.
GEORGE F. JENKINS
BY
George H. Fisher
ATTORNEY Patented Nov. 8, 1949

2,487,556

UNITED STATES PATENT OFFICE 2,487,556

CONTROL APPARATUS

George F. Jenkins, Minneapolis, Minn., assignor to Minneapolis-Honeywell Regulator Company, Minneapolis, Minn., a corporation of Delaware Application October 8, 1945, Serial No. 620,983

5 Claims. (Cl. 236—68)

The present invention comprises heat control apparatus wherein a rise in temperature of a space being heated is anticipated by a self-generated increased temperature of the temperature sensing element.

It is a common characteristic of heat control systems to ignore the heat capacity of the heating means used. As a consequence, after the heating means has been stopped or deenergized by the temperature responsive means in the space being heated, the temperature in said space continues to rise due to the dissipation of the residual heat of the heating means. In addition to the heat capacity of the heating means tending to cause overrunning of the desired temperature, the time lag of the temperature responsive element in responding to the average temperature of the space being considered also tends to cause the space temperature to exceed the desired value.

It is therefore an object of the present invention to provide improved temperature control apparatus capable of anticipating a change in temperature due to the energizing of the temperature changing means.

It is a further object to provide an improved temperature control system using a temperature responsive resistor sensing element wherein a rise in temperature is anticipated by increasing the temperature of said resistor.

It is an additional object to provide temperature control apparatus of the resistance bridge type wherein the voltage imposed on said bridge is varied in response to the energizing of temperature changing means.

It is also an object to provide temperature control apparatus in which the ambient temperature of the apparatus, excluding the temperature responsive element, is of little consequence.

It is another object to provide temperature control apparatus of the resistance bridge type and capable of temperature change anticipation which is simple and dependable and involves a minimum of wiring and equipment.

It is a further object to provide heat control apparatus of a precision type including the feature of heat anticipation to further increase the accuracy of the apparatus.

It is an additional object to provide heat control apparatus of the resistance bridge sort wherein heat anticipation is provided by increasing the input voltage of the bridge sufficiently to cause a temperature rise in a temperature responsive resistor.

It is also an object to provide a temperature control system usable with either heating or cooling equipment and capable of anticipating changes in temperature in either direction with only minor modifications.

These and other objects will become apparent as the description proceeds.

The single figure of the drawing shows schematically the present apparatus and the connections thereof.

In the drawing, an enclosed space 10 is heated by an electric heating element 11, the electric heating element being illustrative of any heating means that can be electrically controlled. The enclosed space 10 may be an oven, a room or other enclosure, or may be considered representative of a medium the temperature of which it is desired to control.

A temperature sensing element 12 comprises a resistor having a relatively high temperature coefficient of resistance and forms part of a bridge or voltage dividing network circuit generally designated by the numeral 13. As shown, wire 14, resistor 12 and wire 15 forms the lower right hand branch of the bridge; resistor 16 and adjustable wiper 19 forms the lower left hand branch; resistor 17, the upper left hand branch; and resistor 18 forms the upper right hand branch of the network circuit. Connections 20 and 21 form the input terminals and connections 22 and 23 form the output terminals of network 13. Resistor 12 is preferably made of material having a relatively high temperature coefficient of resistance such as nickel, whereas resistors 16, 17 and 18 are preferably made of material having a relatively low temperature coefficient of resistance, such as manganin. The balance of the network, or the control point, may be adjusted by varying the position of wiper 19 on resistor 16.

A transformer 25 having a primary winding 26 and a secondary winding 27 provides a source of electric current for energizing the network circuit 13. Secondary winding 27 includes a terminal 28, an intermediate tap 29 and a terminal 30. Primary winding 26 is connected to line wires 31 and 32 by wires 33 and 34, respectively.

An amplifier 40 is connected to output terminals 22 and 23 of network 13 by wires 42 and 43, respectively, and actuates a relay 45 in response to the conditions of balance of said network. Amplifier 40 may be of any suitable sort but preferably is of an electronic null point type. However, it is noted that amplifying means comprising a sensitive relay, such as one of the depressor bar type, is entirely adequate for many installations.

Relay 45 is conventional and includes a winding 46, a switch blade 47 engageable with "in" contact 48, and a switch blade 49 engageable with "in" contact 50 or "out" contact 51.

To better illustrate the coaction of the above apparatus, attention is directed to the following description of operation.

*Operation*

With the present apparatus in the position shown, it may be considered that the temperature requirements in the enclosed space 10 are satisfied, bridge network 13 is balanced, relay 45 is deenergized and no current is being provided heating element 11. The desired temperature to be maintained has been selected by adjusting wiper 19 on resistor 16 to a point wherein the bridge will be balanced when resistor 12 is at the selected temperature. Bridge 13 is energized by a predetermined voltage, 10 volts for instance, by the circuit: tap 29 of transformer secondary winding 27, wire 55, "out" contact 51 and switch blade 49 of relay 45, wire 56, terminal 20 of network 13, terminal 21 of said network, wire 57, and terminal 28 of said secondary winding. Amplifier 40 is supplied current by the circuit: line wire 31, wire 41, amplifier 40, wire 42, and line wire 32.

If the temperature in space 10 should now decrease, the temperature of resistor 12 will fall accordingly. A decreased temperature of resistor 12 results in a lowered resistance of same and thereby causes an increased current flow in the right hand side of the bridge network. This causes a potential difference to exist between output terminals 22 and 23 of the network, thereby providing a signal voltage to amplifier 40, the connections being previously described. The signal potential in the input of amplifier 40 causes operation thereof resulting in the energizing of relay 45 by the circuit: an output terminal of amplifier 40, wire 58, relay winding 46, wire 59 and the other output terminal of said amplifier.

Energizing relay 45 causes the same to pull in its switch blades and thereby energizes heating element 11 by the circuit: line wire 31, wire 61, contact 48 and switch blade 47 of relay 45, wire 62, heating element 11, wire 63, and line wire 32. At the same time, switch blade 49 is pulled out of engagement with contact 51 and into engagement with contact 50.

Network 13 is now energized by the circuit: terminal 30 of secondary winding 27, wire 64, contact 50 and switch blade 49 of relay 45, wire 56, terminal 20 of network 13, terminal 21 of the same, wire 57, and terminal 28 of winding 27. This causes the maximum voltage available from transformer 25, such as 20 volts, to be imposed on the network circuit.

With heating element 11 energized and warming space 10, the temperature of the same rises, thus tending to cause the temperature of resistor 12 to rise accordingly. However, since the network now has twice the previous voltage imposed on it, substantially twice the current is flowing through the branches of the network. This results in four times as much heat in the resistors due to current flow as previously and thereby raises their temperatures. The increase in temperature of resistors 16, 17, and 18 is of little or no consequence because of their low temperature coefficients of resistance, but due to the relatively high coefficient of resistance of resistor 12, its resistance is increased sufficiently to simulate a few degrees temperature increase in space 10. Thus the temperature of space 10 is increased by heating element 11 and simultaneously therewith, the operating temperature of resistor 12 is increased to a value preferably a few degrees above the space temperature. The actual temperature to which resistor 12 responds, at any moment while heater 11 is energized, may thus be considered to anticipate a rise in the temperature of space 10.

When the operating temperature of resistor 12, due to its own heat and the temperature of space 10, rises sufficiently high, and thereby increases its resistance sufficiently to balance network 13, an input signal voltage is no longer furnished amplifier 40 and relay 45 is therefore deenergized. With relay 45 deenergized, switch blade 47 drops out of engagement with contact 48 and heating element 11 is deenergized. Further, switch blade 49 again engages contact 51 instead of 50 thereby reducing the voltage on network 13 and reducing the heating of said resistors due to current flow to a negligible value. At the moment relay 45 is deenergized, the actual temperature in space 10 may be, for instance, 2 or 3 degrees below that desired, resistor 12 being at the desired temperature due to its added heat. Now, when the voltage on the network is reduced and the added heat in resistor 12 is dissipated to space 10, thus tending to lower its temperature, it should be noted that the residual heat of resistor 11 is also being dissipated to space 10. This raises the temperature in space 10 a few degrees even though the current supply to the heater has been cut off. The net result is that the temperature of space 10 levels off at the desired value, overshooting of the temperature being prevented by anticipating the rise in temperature due to residual heat of the heating means. In addition, as the rate of heat transfer from the heating means 11 is gradually lowered as the said means loses its heat, the resulting lower rate of temperature change in the space 10 permits resistor 12 to more accurately respond to the average temperature of the space by reducing the effect of lag.

The present apparatus may also be used for control of cooling apparatus by substituting cooling means for heating means 11 and by connecting tap 29 to contact 50 and terminal 30 to contact 51. The input connections to amplifier 40 may also need to be reversed, depending upon the particular amplifier used. With these changes, resistor 12 would normally be heated a few degrees above the space temperature due to the full voltage imposed on the network. However, when the space temperature rises sufficiently to unbalance the network and cause the amplifier 40 to energize relay 45, thus causing operation of the cooling means, the reduced voltage then imposed on network 13 would reduce the heating of resistor 12 and thus anticipate a reduction in space temperature.

While the present invention has been illustrated and described in its preferred form, many alternatives and substitutions will be readily apparent to those skilled in the art. The present disclosure should therefore be considered as illustrative only, with the scope of the invention being determined solely by the appended claims.

I claim:

1. In a temperature control system, in combination, means for heating a medium, a bridge network circuit having input and output terminals and including a resistor having a relatively high temperature coefficient of resistance responsive to the temperature of said medium, amplifier means, means connecting the output terminals of said network to said amplifier means, relay means including switch means for controlling said heating means and additional switch means, a transformer including a secondary winding for supplying an electric current to the input terminals of said network circuit, said secondary winding having terminals and an intermediate tap, and means including said additional switch means for connecting said secondary winding to the input terminals of said network in such manner that said additional switch means determines whether said tap or a terminal of said secondary winding is connected to one of the input terminals of said network.

2. In a temperature control system, in combination, controllable means for changing the temperature of a medium, a voltage dividing network including a resistor having a relatively high temperature coefficient of resistance responsive to the temperature of said medium, amplifier means, circuit means connecting the output of said network to said amplifier, means adapted to be connected to a source of electricity for imposing a predetermined voltage on the input of said network, switching means controlled by said amplifier for causing operation of said temperature changing means when the medium temperature varies to a predetermined value, and circuit means also controlled by said amplifier means to cause a substantially different voltage to be imposed on said network when said temperature changing means is caused to operate.

3. In a heat control apparatus, means for heating a medium, means for controlling said heating means, temperature responsive resistor means having a relatively high temperature coefficient of resistance for responding to the temperature of said medium, amplifier means, normally balanced electric network circuit means including said resistor for controlling said amplifier means, supply means for causing a relatively small electric current to flow in said network circuit, and switching means controlled by said amplifier means for actuating said controlling means and simultaneously increasing the current flow in said circuit so that the current flowing through said resistor will increase the temperature of the said resistor and thereby increase its resistance.

4. In a heat control apparatus, means for heating a medium, means for controlling said heating means, resistor means having a relatively high temperature coefficient of resistance for responding to the temperature of said medium, amplifier means, electric circuit means including said resistor for controlling said amplifier means, circuit means including a plural voltage transformer for imposing a predetermined potential on said circuit means, and switching means controlled by said amplifier means for causing operation of said heating means and for considerably increasing the potential imposed on said circuit means by said transformer.

5. In a control apparatus for a heating system, temperature sensing means comprising a network circuit including a resistor having a relatively high coefficient of resistance, electrical means for variably energizing said network circuit, amplifier means controlled by said network circuit for controlling said heating system, and switching means operated by said amplifier means for anticipating a rise in temperature at said sensing means by varying the energizing current in said network circuit and resistor.

GEORGE F. JENKINS.

REFERENCES CITED

The following references are of record in the file of this patent:

UNITED STATES PATENTS

| Number | Name | Date |
|---|---|---|
| 1,276,589 | Steinmetz | Aug. 20, 1918 |
| 1,407,411 | Harlow | Feb. 21, 1922 |
| 1,715,750 | Gano | June 4, 1929 |
| 2,148,491 | Moore | Feb. 28, 1939 |
| 2,209,610 | Persons | July 30, 1940 |
| 2,278,633 | Bagnall | Apr. 7, 1942 |
| 2,292,975 | Spangenberg | Aug. 11, 1942 |

FOREIGN PATENTS

| Number | Country | Date |
|---|---|---|
| 144,669 | Great Britain | Sept. 9, 1921 |
| 557,707 | Great Britain | Dec. 1, 1943 |
| 640,150 | Germany | May 26, 1934 |